May 19, 1953  S. J. RAITERI  2,638,839
BEVERAGE URN
Filed March 27, 1948  4 Sheets-Sheet 1

Inventor
Stephen J. Raiteri
Wooster & Davis, Attorneys

May 19, 1953        S. J. RAITERI        2,638,839
BEVERAGE URN

Filed March 27, 1948        4 Sheets-Sheet 2

Inventor
Stephen J. Raiteri
By Thwaster & Davis, Attorneys

May 19, 1953  S. J. RAITERI  2,638,839
BEVERAGE URN
Filed March 27, 1948  4 Sheets-Sheet 3
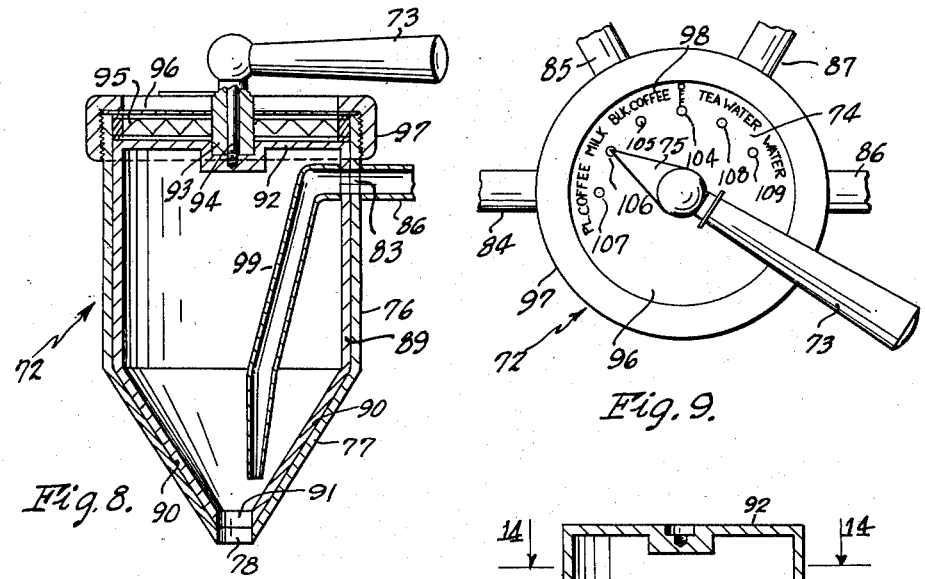
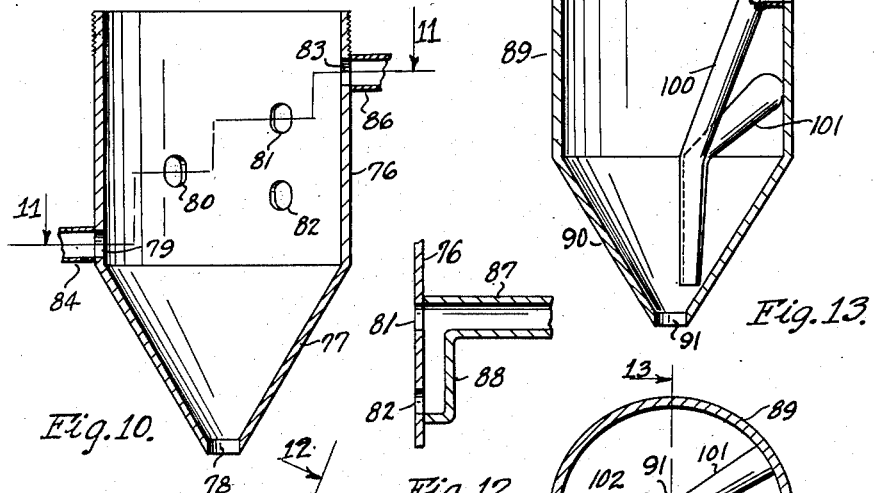
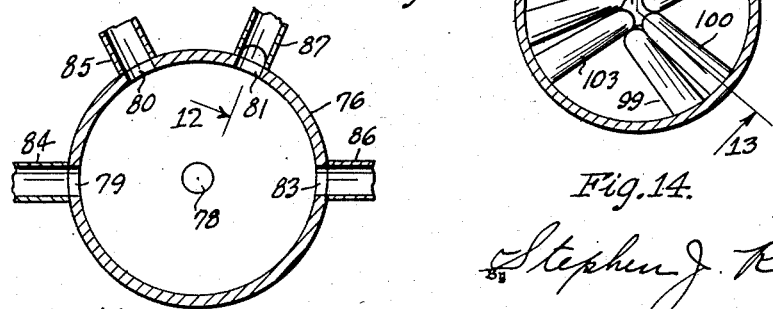
Inventor
Stephen J. Raiteri
Wooster & Davis, Attorneys May 19, 1953  S. J. RAITERI  2,638,839
BEVERAGE URN
Filed March 27, 1948  4 Sheets-Sheet 4

Inventor
Stephen J. Raiteri
Wooster & Davis, Attorneys

Patented May 19, 1953

2,638,839

UNITED STATES PATENT OFFICE 2,638,839

BEVERAGE URN

Stephen J. Raiteri, Stamford, Conn.

Application March 27, 1948, Serial No. 17,475

5 Claims. (Cl. 99—283)

This invention relates to a beverage urn, particularly to an urn for use in restaurants for making coffee, furnishing hot water for tea, and so forth, and has for an object to provide a simple and effective structure for making coffee, furnishing hot water for tea, and so forth, and which will be semi-automatic.

Another object is to provide a structure in which the coffee is made by water seeping through the ground coffee, so that the coffee grounds are not suspended in the hot water.

A further object is to provide an improved means for controlling the drawing of coffee or water or other liquids from the urn or associated containers.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 8 is a vertical section of the control valve for drawing the coffee and other liquids;

Fig. 9 is a top plan view thereof;

Fig. 10 is a vertical section of the outer casing of this valve;

Fig. 11 is a transverse section of the device of Fig. 10 substantially on the line 11—11 of Fig. 10, and showing the pipe connections;

Fig. 12 is a detail section of a portion of this casing substantially on the line 12—12 of Fig. 11;

Fig. 13 is a vertical section of the inner member of this control device;

Fig. 14 is a transverse section thereof, substantially on line 14—14 of Fig. 13;

Figures 1, 2:
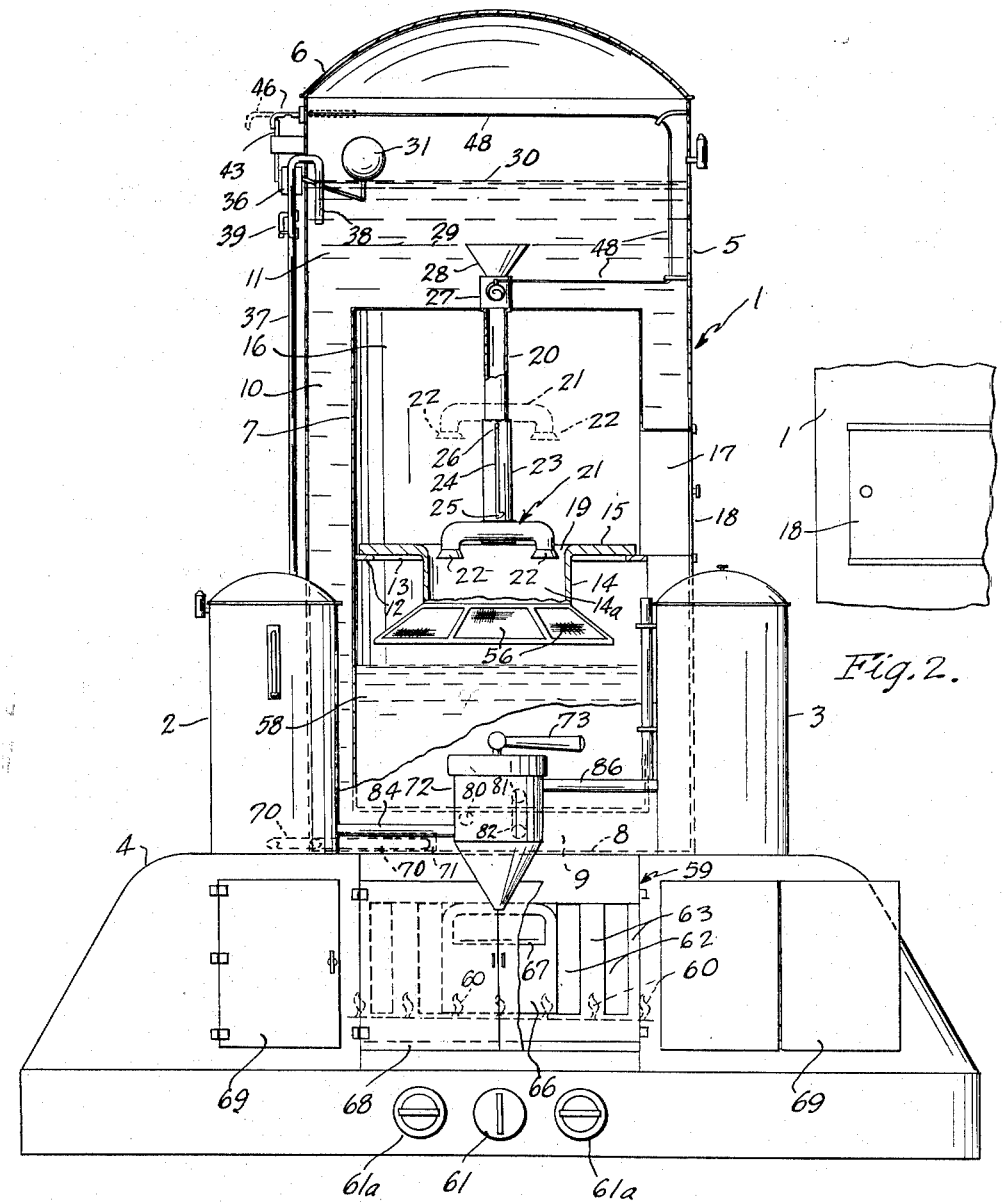
Fig. 1 is a partial front elevation and partial vertical section of my improved urn.
Fig. 2 is a detail side elevation showing a door structure.

The device comprises a composite urn including a main container 1 and smaller auxiliary containers 2 and 3, the main container 1 being for holding coffee and water for making the coffee, the smaller container 2 being for hot water for furnishing this plain hot water when desired, as for example, in making tea, and the container 3 for milk or cream, and all three are associated and mounted on a common base 4 which may contain the heating units and controls for them for maintaining the proper temperatures for liquids in the containers 1 and 2, and also may be used for keeping various articles warm and also for making toast for toasted sandwiches, as will be more fully described later.

The main container 1, as illustrated, comprises a cylindrical body 5, preferably of suitable metal, closed at the top by a suitable cover 6. Inside this body is a coffee container 7 which may be of any suitable material, such, for example, as metal or glass, preferably the latter, and this container is spaced from the bottom 8 of the container 1 to leave a water space 9, and it is also spaced from the sides of the body 5 so that it is surrounded by a water space 10. It is also of less height than the body 5, so that there is still another water space 11 above the container 7. In this coffee container 7 is a transverse wall 12 provided with an opening 13 in which is mounted a coffee strainer and maker 14, it being supported by a flange 15 resting on the wall 12. Above this coffee strainer and maker is a chamber 16 to which leads an opening 17 through the side of the body 5, this opening being closed by one or more curved sliding doors 18 which permit access to the chamber 16 for insertion and removal of the strainer and maker 14 and also for placing ground coffee in this strainer and maker through the opening 19 at the top.

Projecting downwardly from the top wall of this chamber 16 is a water pipe 20 carrying and communicating with a sprinkler 21 including discharge nozzles 22 which are preferably directed laterally at an angle so that when water flows through them it produces an impulse action to rotate the nozzles about the axis of the supply pipe 20 and to distribute the water more uniformly over the coffee grounds in the strainer and coffee maker 14. This sprinkler 21 also includes an upright sleeve or pipe 23 telescoped over the water supply pipe 20 for longitudinal sliding movement thereon, and is provided in its side wall with a longitudinal slot 24 with a lateral offset 25 in one end, there being a projection 26 on the pipe 20 extending into this slot so as to permit the nozzles 22 to be raised to a position above the strainer and coffee maker 14, as indicated in dotted lines Fig. 1, and be retained therein by pin 26 in offset 25 to hold the nozzle above and clear of the strainer 14 to permit free access to it for either insertion or removal of this strainer and coffee maker and placing of the coffee grounds in it, after which the nozzles may be readily lowered to the full line position for the operation of making the coffee. The supply pipe 20 extends through the top wall of container 7 over the space 16 and communicates with a control valve 27 to which is connected a funnel 28 open at the top in communication with the water in the chamber 11, the top edge of this funnel being on the water level 29 and therefore determines this level, and it will be understood that at any level between this level 29 and the highest level 30 water may flow in through the funnel 28 and through the spray nozzles 22 whenever the valve 27 is open. In the position of Fig. 1 this valve is closed. It is open in the position of Fig. 3. The water levels 29 and 30 are controlled by a float 31 in the space 11, and this is connected with a lever 32 on the outside of the container provided with a fork 33 between which is a stop or projection 34 on the arm 35 operating the supply control valve 36 in the supply pipe 37 having a downwardly discharging end portion within the space 11 similar to that shown at 38 in Fig. 3, and there may also be in the pipe 37 forwardly or below the valve 36 a hand shut-off valve 39. Below the valve 39 is a branch connection 40 also leading into the space 11 with a downwardly directed discharge end 38, and in this pipe branch is a hand-operated cut-off valve 41. By means of valve 39 the branch containing the automatically controlled valve 36 can be shut off, and by means of the branch 40 and valve 41 water may be supplied to container 1 independently of the automatic valve.

A spring 42 is connected to the valve lever 35, and is arranged to snap by a center of the movable valve element on operation of this lever 35 to give a snap action to the valve and also to hold it in the fully open or fully closed position. Also connected to the valve lever 35 is a stop rod 43 operating through a suitable guide 44 and connected to a spring 45 tending to hold this stop rod in its upper position with its upper end against a control rod 46. This rod extends through suitable guides 47 in the side of the container 1 and is connected by a flexible wire or connection 48 with the laterally extending arm 49 on the rotatable element of the valve 27. The free end of the rod 46 is provided with a handle 50 and on its underside is provided with a stop notch 51 adapted to cooperate with the upper end of the stop rod 43 to hold the rod 46 in its outer position, as shown in full lines Fig. 3. A spring 52 tends to shift the rod inwardly and close the valve 27, and there may also be an additional spring 53 on the stem of this valve to assist the spring 52 and insure this valve is turned to the closed position when the rod 46 is released.

Figure 3:
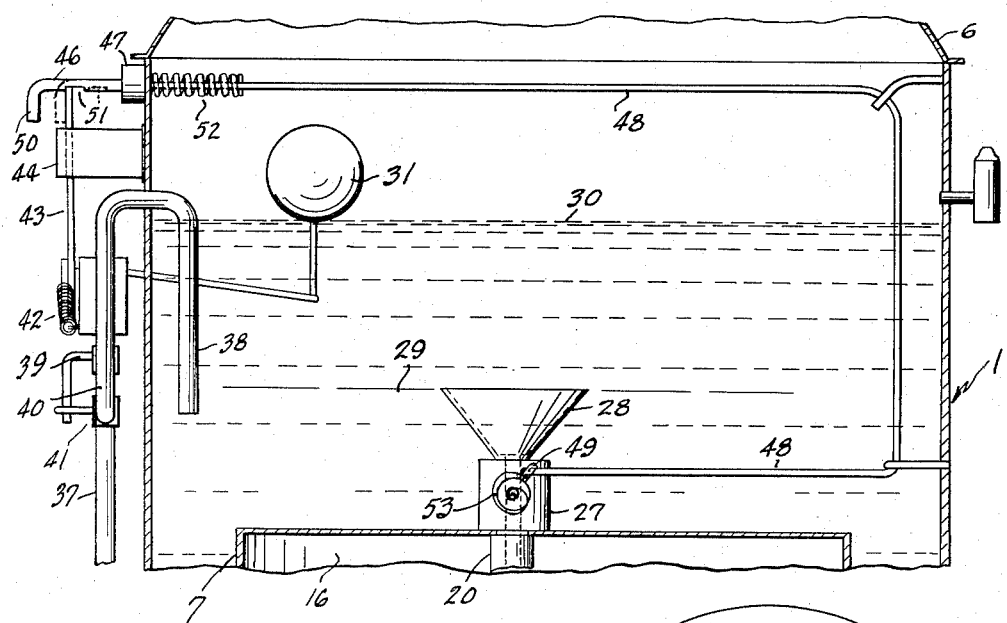
Fig. 3 is a section of the upper part of the main container of the urn on a somewhat enlarged scale.

When this rod 46 is in its innermost position, as shown in full lines Fig. 1 or dotted lines Fig. 3, the valve 27 is closed, but when it is drawn outwardly to the dotted line position of Fig. 1 or the full line position of Fig. 3, the valve 27 is open, permitting water from the space 11 to flow through the funnel 28 and pipe or conduit 20 to the sprinkler nozzles 22, to be discharged on the ground coffee in the strainer and coffee maker 14. When pulled out to this position the rod 46 is held by the catch 43 seating in the notch 51 which therefore also holds the valve 27 in the open position. If the catch rod 43 is shifted downwardly to withdraw its free end from the notch 51, it will release the rod 46 and permit the springs 52 and 53 to close the valve 27 and shut off flow of water from the space 11 to the sprinkler.

The strainer and sprinkler 14 has a frustoconical lower portion 54 which has an imperforate bottom wall 55 and the side walls include removable screen panels 56 which form strainers to permit the water to pass through from the ground coffee 57 but retain these grounds in the coffee maker. With this arrangement improved coffee making action is secured, because the hot water from the sprinkler nozzles 22 is spread over this ground coffee and seeps down through it and then up out the strainers 56 dropping over the outer lower edge of the conical portion 54 into the lower portion of the coffee container 7, where it is retained as shown at 58, and, of course, as it seeps through the coffee grounds it absorbs and extracts the coffee flavor and oils and soluble ingredients from the ground coffee. As this container 7 is surrounded by hot water in the spaces 9 and 10 this coffee extract is maintained in a heated condition and may be drawn off for beverage purposes.

Figure 4:
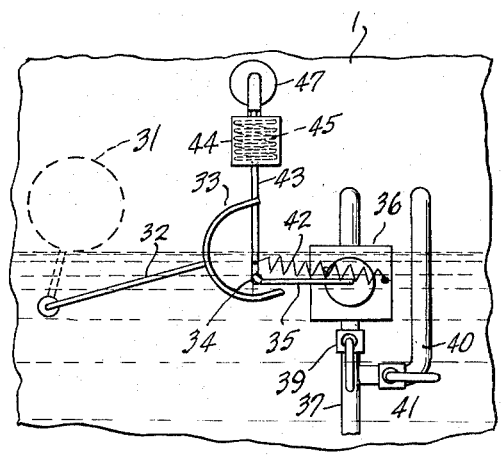
Fig. 4 is an elevation of the valve control mechanism, looking from the left of Figs. 1 and 3.
Figure 5:
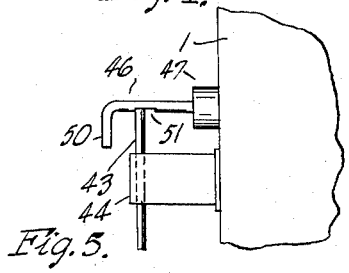
Fig. 5 is a detail elevation showing the valve control in one position.

The water level 30 is controlled automatically by the float 31 after the valve 36 is opened to supply water to the container after the valve 27 has been closed. When the level reaches the upper limit 30, the float 31 through the lower arm of the fork 33 acting on the stop 34 swings the valve arm 35 up to the position of Fig. 4 to close the valve 36. The water level therefore remains stationary until the valve 27 is opened by means of the hand operated rod 46, as previously described, permitting the water to flow through the funnel 28 to the sprinkler 21 and after the water level reaches the line 29 at the top of this funnel, dropping of the float 31 with the water level causes the upper arm of the fork 33 to reach the stop 34 on the valve stem 35 and swing it downwardly to open the valve 36 and supply more water to the space 11. At the same time this action lowers the catch rod 43, releasing the hand operated rod 46 to permit the valve 27 to close and remain closed until again opened by pulling the rod 46 outwardly.

Figures 22, 23:
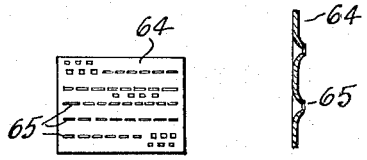
Fig. 22 is a plan view of one of the side plates of the gas heater of Fig. 19.
Fig. 23 is a section on an enlarged scale of a portion of a plate of Fig. 22.

Within the base 4 and under the bottom of the container 1 is a heating means 59. This may be either a gas or electric heater, that shown in Fig. 1 being a gas heater, as indicated by the flames 60, the heat impinging against the bottom wall 8 of the main container 1 and maintaining its contents heated to the proper temperature at substantially boiling. The gas supplied to the heater is controlled by any suitable means, as indicated diagrammatically at 61, and if desired there can be a suitable thermostat in the water space 10 controlling the gas supply to maintain the temperature of the water uniform and at the proper elevation. The thermostat is not shown in the drawing as it can be of any conventional type of thermostat control used for heating elements of this type. This particular heating unit, however, comprises upright laterally spaced rectangular chambers or spaces 62 for slices of bread in making toast, the flame 60 of the gas burner being in intermediate upright relatively narrow passages 63 between them, the walls of these passages preferably being plates 64 (Fig. 22) provided with a series of slots or openings 65 formed preferably by punching the plate and forcing the sides laterally somewhat, as shown in Fig. 23, to permit the heat from the gas flame to impinge on the sides of the slices of bread in the spaces 62 to toast it, the projections, however, holding the slices spaced from the body of the plate 64. Automatic means, not shown, may be employed if desired to eject the toast and sound a sginal when the bread is properly toasted, such, for example, as clock controlled mechanism. The hot gases pass upwardly and impinge against the bottom 8 of the main container 1 and there may or may not be an exit flue leading to a chimney flue, as found desirable. In the center portion of this heater 59 is a wider chamber 66 containing a perforated horizontal compartment or holder 67 forming a sandwich toaster. The front of the base 4 with this heater is provided with one or more doors 68 permitting access to the heating unit and for inserting slices of bread in the chambers of the toasting unit and removing them. The spaces on the right or left of the heating unit may be used as warming spaces or as spaces to keep food hot, and there may be doors 69 leading to these spaces.

Mounted on the base 4 closely adjacent the main container 1 is the auxiliary or smaller container 2 for hot water for supplying plain hot water for any purpose, such, for example, as making tea. There is a heating coil 70 communicating at its opposite ends with the lower part of this container 2 for circulation of water through it, the coil being located in a recess 71 in the bottom of the container 1 and exposed to direct heat from the heating unit 59, either gas or electric, whichever is used, to heat and maintain the water hot in container 2. On the opposite side and supported on the base is a similar auxiliary container 3 for milk or cream.

Each of the containers 1, 2 and 3 is connected with a single draw-off valve 72 which is a five-way control valve operated by a handle 73 with a suitable indicator 74 shown in Fig. 9, cooperating with a pointer 75 movable with the handle. It will be seen that in the different positions as indicated, the valve will draw either a normal amount of coffee for mixture with cream when in the left position, milk in the next position, and black coffee in the next position at one side of the intermediate "off" posiiton, and in the next position on the other side of the off position tea water from the container 2, and in the next position plain water from the container 1. To effect these controls the device 72 is shown as constructed in Figs. 8 to 14. This dispensing or draw-off control comprises an outer casing 76 including a cylindrical body portion and a conical lower portion 77 provided with discharge opening 78 in its lower end. The cylindrical body wall is provided with a series of openings 79, 80, 81, 82 and 83 suitably spaced and located for the desired control functions and connected by suitable pipes or conduits to the containers 1, 2 and 3. The lower opening 79 is connected by a conduit 84 with the container 2. The next opening 80 is connected by a conduit 85 with the water space 9 in the main container 1, while the opening 83 is conected by a conduit 86 with the milk or cream container 3. The coffee container 7 is connected by the conduit 87 to the openings 81 and 82, which openings, as shown in Figs. 10 and 12, are located one above the other and connected by a short conduit 88, leading from the conduit 87 to the lower opening 82. Within the casing 76 is the movable valve element 89 of substantially the same shape as the casing 76 including a cylindrical body and a conical lower portion 90 provided with a discharge opening 91 in alignment with the opening 78, as shown in Fig. 8. This member fits in the member 76, but may turn therein. It has a closed top wall 92 which is connected by a stem 93 with the operating handle 73 to be connected together by a suitable bolt 94. Above the top wall 92 of the movable element is a spring or corrugated disc structure 95, between this top wall and the diaphragm 96 clamped against the end of casing 76 by a cap 97 threaded on the casing. This diaphragm closes the top of the casing and carries the indications 98 of the indicator 74. The spring structure 95 presses the movable valve member 89 downwardly against the conical lower part of casing 76 to make a tight leak-proof fit between them and provides a friction to hold the valve in different positions to which it is shifted by handle 73. The cap 97 may be removed to permit removal of the inner valve member 89 to permit easy cleaning of this member and other parts of the device.

On the inner side of the movable valve member 89 are mounted a series of short nozzles or pipes 99, 100, 101, 102 and 103 secured to the inner wall of the member and each communicating with an opening through the side wall, and which openings to these various nozzles are on the level with one of the openings 79 to 83 in the valve casing. Each nozzle extends downward toward the discharge opening so as to deliver any liquid flowing through it closely adjacent this opening, as shown in Figs. 8, 13 and 14. The nozzle 99 is connected to an opening in the valve 89 on the level with the opening 83 from pipe connection 86 to the milk container or urn 3. The opening to the nozzle 100 is on the level with the opening 81, and that of nozzle 101 is on the level with the opening 82, so that both of these nozzles may be connected to the pipe 87 leading from the coffee container. The opening to the nozzle 102 is on the level with the opening 80, so that it may be connected to the water space of the main urn 1 by pipe 85. The nozzle 103 is on the level with the opening 79 connected by pipe 84 to the hot or tea water container 2. Therefore, it will be evident that by turning the valve member 89 by the handle 73, these various nozzles may be brought into alignment with the various openings in the valve casing 76 and the pipes leading from them to the various liquid containers, depending on what liquid it is desired to draw from the device. Thus, for example, when the handle 73 is turned to bring the pointer over the indication 104, all the various nozzles in the valve are out of alignment with the conduits leading to the valve and the valve is in the "off" position where all conduits are closed. If you move the handle to the right to bring the pointer over indication 105, then the nozzle or conduit 101 is in alignment with the opening 81 and black coffee will be drawn from the container 56. If the handle is moved to the next position over indication 106, conduit 99 is opposite the milk conduit 86 and milk will be drawn from the container 3. If moved still further to the position 107, then conduit 100 is in alignment with the opening 82 and coffee may be drawn for the milk already drawn. If the handle is moved to the left to bring the pointer to the position 108, then the conduit 103 is in alignment with the opening 79 and tea water is drawn from the container 2. When the handle is moved still further to the position 109, conduit 102 is brought into alignment with the opening 80 and plain water may be drawn from the water space 11. This is the water from the container 2 for making tea and the draw-off connections from it are kept separate from that connected with the water space 10 of the main container 1 so that there is no danger of contaminating the water from the container 2 with coffee.

Figure 6:
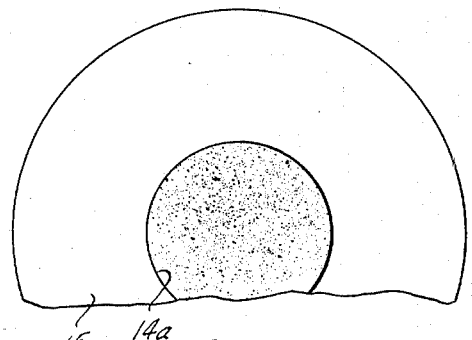
Fig. 6 is a top plan view of the holder for ground coffee removed from the urn.
Figure 7:
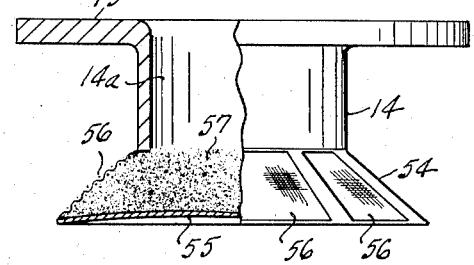
Fig. 7 is a partial side elevation and partial section of this holder.
Figure 15:
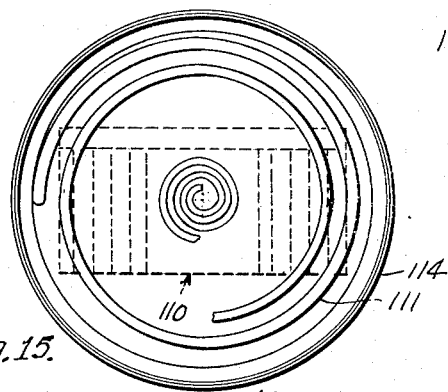
Fig. 15 is a top plan view of a portion of the base supporting the main unit and showing an electrical heating unit.
Figure 17:
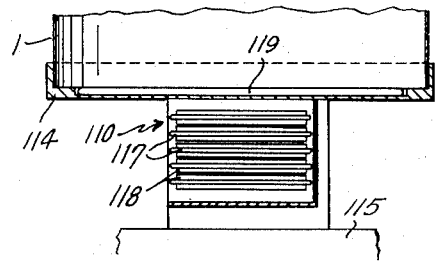
Fig. 17 is a section substantially on line 17—17 of Fig. 16.
Figure 16:
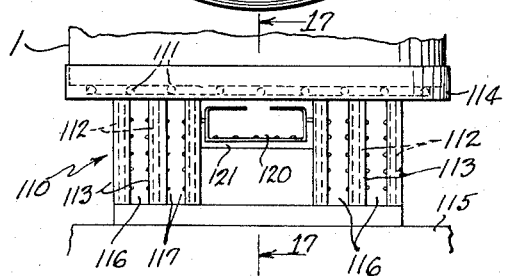
Fig. 16 is a front elevation thereof.
Figure 18:
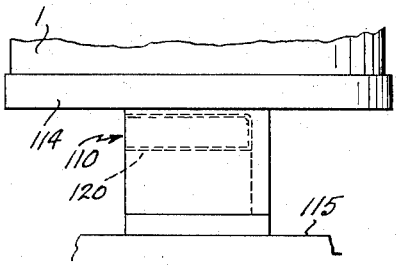
Fig. 18 is a side elevation looking from the right of Fig. 16.
Figure 19:
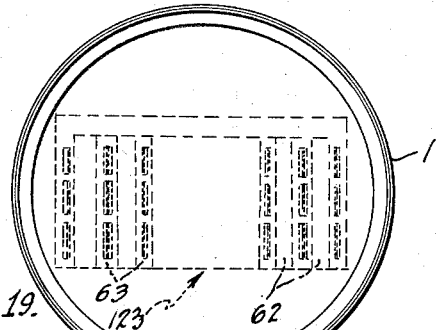
Fig. 19 is an end view of a heater base for the main container of the urn showing a modified construction and arranged for gas heating.

The coffee maker 14 is an entirely new development for this device. As shown in Figs. 6 and 7, the bottom 55 is closed and the sides above this are inclined or tapered with openings through it covered with removable fine mesh screens 56, and these are located at the lower part of the downward passage 14a. The ground coffee indicated at 57 is placed in this device on the bottom 55 and as the spray water is directed onto it from the nozzles 22 the ground coffee soaks it up, the water absorbs the coffee flavor and other soluble ingredients of the ground coffee and then passes up and out the screens 56 so that water is maintained the proper length of time in contact with the ground coffee to secure this action, and there is no danger of the grounds being carried through the screens with the water.

The devices for heating the container 1 and maintaining it at the proper temperature are shown in Figs. 1 and 15 to 23. This may be either an electrical or gas heater or a combination of the two. The device of Figs. 15 to 18 is an electric heater indicated as a whole at 110, mounted in the base 4 immediately under the main container 1. It may comprise several electric heating units, one being a coil 111 immediately under the bottom of the container 1, and other units 112 in upright rectangular compartments 113 extending between the top supporting member 114 and the supporting base 115. These compartments 113 are substantially the same as those shown at 63 for the gas type of heater and are spaced laterally to provide spaces 116 between them open at the front for insertion of slices of bread to be toasted, the sides of the chambers 113 preferably being provided with horizontal bars 117 to keep the bread spaced from the walls of the members 113. These walls may also be provided with openings or slots 118 behind the bars 117 to permit direct radiation from the heating units to toast the bread. Heat from the units 112 impinges either directly against the bottom wall of the container 1 or the supporting wall 119 for it, so as to heat the water in this container and maintain it at the proper temperature. There may be also provided in the central part of the heater a sandwich toaster 120 (similar to toaster 67 of the gas type of heater) open at the front for insertion of a sandwich to be toasted and it may also have heating units in the base portion 121 thereof for the toasting operation, the heat from this unit also heating the main container 1. These units may be controlled by any suitable controlling means, such, for example, as a hand control knob indicated at 61a in Fig. 1.

Figure 20:
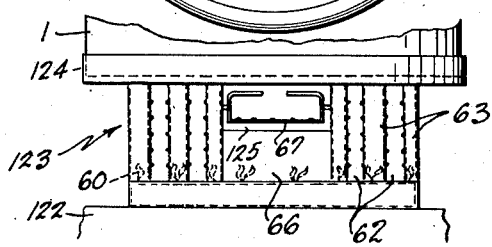
Fig. 20 is a front elevation of the device of Fig. 19.
Figure 21:
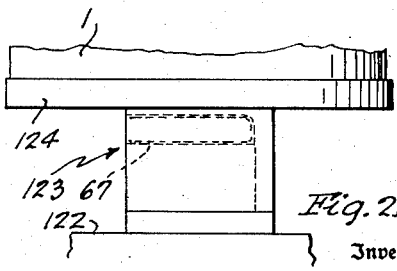
Fig. 21 is a side elevation looking from the right of Fig. 20.

If gas heat is used it is of substantially the same construction and arrangement as that of the electric heater. It is shown more in detail in Figs. 19 to 23, and is also shown as being in position in Fig. 1. This is mounted between the main container 1 and the base support 122, as indicated in Figs. 1 and 20, and is indicated as a whole by the element 123, the lower end of the container 1 being seated in the top wall 124. It comprises the rectangular laterally spaced upright hollow members 63 corresponding to the members 113 of the electric heater, and they are laterally spaced to provide spaces 62 for insertion of slices of bread for toasting, corresponding to the spaces 116 of the electrical type heater, and open at the front in back of the doors 68 of the base 4. Burners for the gas flame are indicated at the bottom of the members 63, as indicated by the dotted lines 60, and the heat from these flames passes up from the members 63 and heats the bottom of the container 1. The side walls of the members 63, as indicated in Figs. 22 and 23, may have slots or openings 65 for heat from the flames to impinge on the bread for toasting it, and they may be formed by lancing and forcing the walls laterally as at 63 to form lugs or bars to maintain the bread spaced from the side plates. Also at the center is a sandwich toaster, as indicated at 67, similar to the toaster 120 of the electric form, with a suitable gas burner in its base 125 for toasting a sandwich and also assisting in heating the container 1. These gas burners may be controlled by any suitable means (not shown) through operation of the hand control knob 61.

In operation of the device water is fed to the main container 1 through the supply pipe 37, and this may be controlled by the hand valves 39 and 41, but ordinarily it is controlled through the automatic valve 36. When the water reaches the upper level 30 the valve 36 is automatically closed by the float 31 and the water allowed to heat from the heating means in the base 4. Then when it is desired to make coffee the valve 27 is opened by the operator pulling outwardly on handle 46. This permits heated water to flow through the funnel 28 and the nozzles 22 onto the coffee grounds 57 in the coffee maker and strainer 14, which of course has been previously placed in this strainer through the side openings 17, and the nozzles 22 lowered to the full line position of Fig. 1. Opening of the valve 27 permits the water to flow through these nozzles from the funnel and be distributed by them onto the ground coffee, which flows slowly through them, absorbing the various soluble ingredients and flows upwardly and outwardly through the screens 56 and down over the lower edge of this strainer structure into the container 58. This action continues until the water level reaches the level 29 of the top of the funnel 28, at which time the flow of the water automatically stops, it being understood this level is controlled by the level of the top of the funnel. During this time the float 31 has followed down with the water level, and at this point it opens the valve 36 permitting fresh water to be fed into the container 1 from the pipe 37 and it also trips the catch 43, 51, permitting the valve 27 to close, so that no more water passes through the funnel 28 to the ground coffee until the fresh water has been heated and the valve 27 again opened by the operator. The various liquids may be drawn off through the dispensing valve 72, as previously described.

It will be understood from the above that this construction and arrangement provides a simple and effective urn for restaurants and the like, and one in which the operation of making the coffee and maintaining it at the proper temperature is very easily controlled. The various liquids may be readily drawn by the single draw-off valve, simplifying this operation and saving time, as it is simply necessary to swing the same handle to the different positions for drawing off the various liquids as desired. Also, the device is very efficient because the means for heating the coffee and the water for making it may be also used for making toast or toasted sandwiches and keeping other articles warm. Also, as all the various elements are in a single unit it is very effective in the saving of space.

Having thus set forth the nature of my invention, I claim:

1. A device of the character described comprising a container for hot water, means for heating the water in said container, a coffee container in the first container and spaced from the walls thereof to provide a water space, a coffee maker mounted in the coffee container comprising a holder for ground coffee including an imperforate base and inclined side walls comprising screening means inclined upwardly and inwardly from the periphery of said base and an entrance opening above said holder, sprinkler means for feeding water through said opening to the ground coffee, and means for feeding water from the first container to the sprinkler.

2. A device of the character described comprising a container for hot water, means for heating the water in said container, a coffee container in the first container provided with a closed top wall spaced below the top of the first container to form a water space, a coffee maker in the coffee container comprising a holder for ground coffee including an imperforate base and inclined side walls comprising screening means inclined upwardly and inwardly from the periphery of said base and an entrance opening above said holder, a sprinkler for feeding water through said opening to the ground coffee, and a valve controlled conduit leading from the sprinkler through the top wall of the coffee container and having an inlet opening in the water space.

3. A device of the character described comprising a container for hot water, means for heating the water in said container, a coffee container in the first container provided with a closed top wall spaced below the top of the first container to form a water space, a coffee maker in the coffee container comprising a holder for ground coffee including screening means, a conduit leading from the coffee maker through the top wall of the coffee container and provided with an entrance opening at a given level therein communicating with the water space, a control valve in said conduit, a supply pipe for supplying water to the first container, a control valve in said pipe, a float in the first container and operable between a high water level spaced above the entrance to the conduit and a lower level at said entrance, an operative connection from the float to the valve in the supply pipe, manual means outside the first container for opening the valve in the conduit to the coffee maker, spring means tending to close the latter valve, a releasable means for holding the valve in open position, and means controlled by the float to release said holding means.

4. A device of the character described comprising a container for hot water, a coffee container in the first container spaced from its top wall to form a water space, a coffee maker in the coffee container including a screened holder for ground coffee, a conduit leading from a given level in the water space to said coffee maker, a control valve in said conduit, a supply pipe leading to the water space, a control valve in said pipe, a float in the water space connected to the latter valve to open and close it and operating between a high level spaced above the entrance to the conduit and a low level at said entrance, a manual control connected to the conduit valve for opening it and extending to the exterior of the first container, spring means tending to close said conduit valve, and a catch cooperating with said manual control to maintain the conduit valve open and releasable by said float to permit this valve to close when the water reaches the lower level.

5. A device of the character described comprising a container for hot water, a coffee container in the first container spaced from its top wall to form a water space, a coffee maker in the coffee container including a screened holder for ground coffee, an open topped funnel in the water space arranged with its top on a given level, a conduit leading from said funnel to the coffee maker, a control valve in said conduit, a float in said water space operating between the level of the top of the funnel and a higher level above this funnel, a water supply pipe leading to the first container, a control valve in said pipe controlled by said float, manual means for opening the conduit valve, spring means tending to close said latter valve, and a catch for holding the conduit valve open and connected with the float for operation thereby to release the conduit valve to cause it to be closed when the water reaches the lower level.

STEPHEN J. RAITERI.

References Cited in the file of this patent

UNITED STATES PATENTS

| Number | Name | Date |
|---|---|---|
| 76,514 | Patterson et al. | Apr. 7, 1868 |
| 82,976 | Murch | Oct. 13, 1868 |
| 368,340 | Kaplan | Aug. 16, 1887 |
| 637,238 | Cottrell | Nov. 21, 1899 |
| 712,292 | Geddes | Oct. 28, 1902 |
| 1,190,381 | Cook | July 11, 1916 |
| 1,237,357 | Maker | Aug. 21, 1917 |
| 1,467,171 | Kelly | Sept. 4, 1923 |
| 1,549,840 | Lemoine | Aug. 18, 1925 |
| 1,551,855 | Svendsgaard | Sept. 1, 1925 |
| 1,603,130 | McDuffie | Oct. 12, 1926 |
| 1,781,669 | Petersen | Nov. 11, 1930 |
| 1,800,368 | Tomlinson | Apr. 14, 1931 |
| 1,813,872 | Bausman | July 7, 1931 |
| 1,850,082 | Medin | Mar. 22, 1932 |
| 1,980,931 | Rothermel | Nov. 13, 1934 |
| 2,030,047 | Bonzagni et al. | Feb. 11, 1936 |
| 2,094,981 | Fromwiller | Oct. 5, 1937 |
| 2,263,610 | Cain | Nov. 25, 1941 |
| 2,366,384 | Cavicchioli | Jan. 2, 1945 |

FOREIGN PATENTS

| Number | Country | Date |
|---|---|---|
| 20,505 | Great Britain | 1897 |
| 13,059 | France | Nov. 2, 1910 |
| 40,826 | Norway | Feb. 1, 1924 |
| 404,109 | France | Oct. 11, 1909 |